June 11, 1929.  J. C. VIVES  1,716,714
MOLD FOR BATTERY NUTS
Filed May 14, 1928
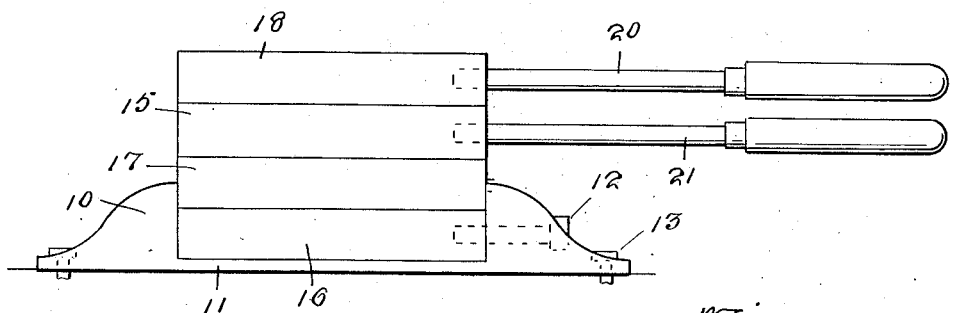
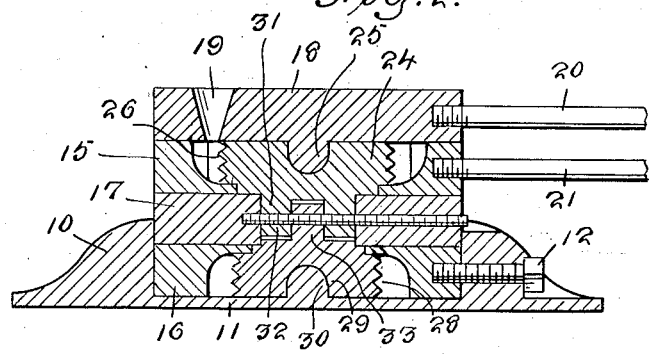
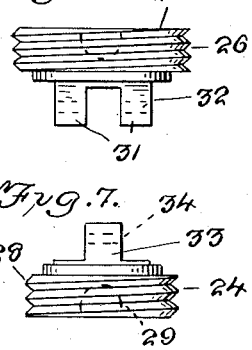
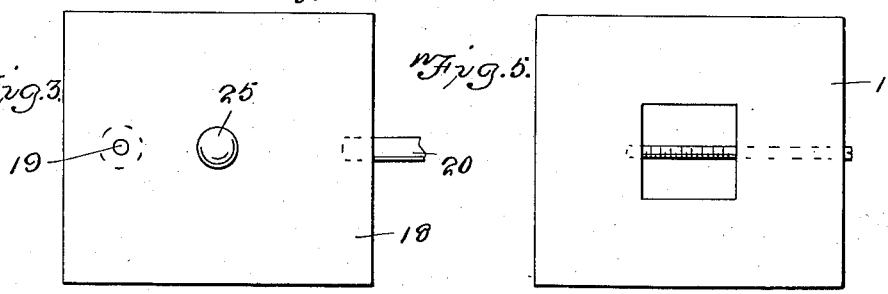
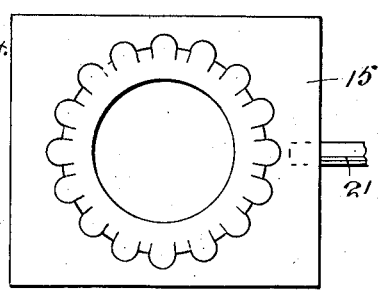
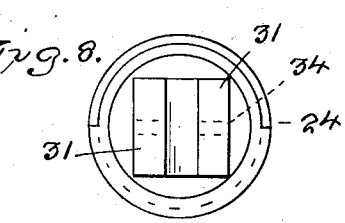
J. C. Vives INVENTOR
BY Victor J. Evans
ATTORNEY Patented June 11, 1929.

1,716,714

UNITED STATES PATENT OFFICE.

JULIUS CEASAR VIVES, OF BROOKLYN, NEW YORK.

MOLD FOR BATTERY NUTS.

Application filed May 14, 1928. Serial No. 277,528.

The object of this invention is to provide a mold by means of which a plurality of nuts may be produced from a two part core held in a stationary position.

A further object is to provide a mold suitable for mounting in a vise or the like, or for mounting on a stationary base, by the use of an element termed an adapter.

A further object is to provide a plurality of independent threaded core members and means for mounting them in connection with a plurality of mold members so that nuts of different sizes or types may be produced, the elements of the core being relatively interchangeable.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:—

Figure 1 is a view of the complete assembly in elevation.

Figure 2 is a view in vertical section.

Figure 3 is a plan view of the cover plate, to be provided with an opening thru which the molten metal will flow into the upper matrix.

Figure 4 is a plan view of one of the matrix blocks.

Figure 5 is a plan view of a block to be placed intermediate of the matrix blocks and to which the connected cores are to be secured by means of a transversely extending screw.

Figures 6 and 7 are views in elevation showing the elements of the two part core.

Figure 8 is a bottom plan view of the element of Figure 6.

The block assembly is adapted to be mounted in a bench vise, or otherwise mounted but in the present instance I have shown the series of blocks to be employed mounted in a device constituting an adapter and having a concavity proportioned to receive the lower blocks, one of which is retained by a transverse screw, the adapter per se being retained on the bench or other support by means of screws passing into the latter. The adapter as a whole is designated 10, the concavity or recess therein for receiving the blocks is shown at 11, the transverse screw passing into the lower block is designated 12, and the other screw devices serving the purpose indicated above are shown at 13.

Particular emphasis is placed upon the several blocks employed and the relation of the two part core to these blocks. The upper matrix block is designated 15, the lower matrix block is shown at 16, an intermediate block is designated 17 and a cover plate or block is shown at 18. The element last named is provided with an opening 19 having a reduced lower portion if desired and the molten metal is to be poured thru this opening into the upper matrix. Cover plate 18 is manipulated by means of a handle 20 and a handle 21 enters an opening in the block 15 and serves to manipulate this and the other blocks when assembled in the manner indicated.

A plan view of one of the matrix blocks is shown in Figure 4, and referring to the core structure it will be observed that the upper element of the two part core, designated 24 is provided with a recess centrally thereof into which the pin or projection 25 is intended to fit, for the purpose of obtaining proper registration between the opening 19 and the upper matrix. Element 24 is externally threaded as indicated at 26, and the nut is to be produced without the rotation of any element in carrying out the operation.

The other element of the core is designated 28 and is externally threaded, being further provided with cavity 29 for receiving pin 30 carried by the central portion of the adapter. The screw 12 is applied after the parts have been assembled, and serves to retain the series of blocks in proper position, because of the interlocking connection now to be described.

The nuts to be formed may be of different character, such as a standard battery nut and a Dodge nut, and the upper core includes a plurality of lugs or ears such as 31, spaced as shown and each provided with a transverse bore as indicated at 32. The lower element of the two part core includes a central lug or ear 33 provided with a transverse bore 34. The bores 32 and 34 will register when the ears are in interlocking position, as indicated in Figure 2, and a long screw of small diameter is passed thru one side portion of the block 17 and thru the bores in the interlocked or engaged devices.

The matrix blocks will have first been assembled as shown in Figure 2 so that upon connecting the elements of the core as indicated, all of the structure below the cover plate will be connected as a substantially unitary device in a manner which will be clearly apparent from close observation of the relation of the parts of the device as they appear in Figure 2.

Having described the invention what I claim is:—

1. In a device of the class described, a plurality of matrix blocks, an intermediate block, a two part core including projecting devices extending toward each other, opposite portions of the core projecting from opposite sides of the intermediate block and into the matrix blocks, and means for connecting the projecting elements of the core.

2. In a device of the class described, a two part core, for molding nuts, independent devices for forming matrix blocks into which the cores extend, and devices connecting the parts of the core together and preventing separation of the matrix blocks.

3. In a device of the class described, a two part core, for molding nuts, independent devices for forming matrix blocks into which the cores extend, and means for mounting the matrix blocks.

4. In a device of the class described, a plurality of matrix blocks and an intermediate block, separate cores, means for connecting the cores with each other and with the intermediate block, the cores each including portions engaging and retaining the adjacent matrix block in contact with the intermediate block.

5. In a device of the class described, a plurality of matrix blocks and an intermediate block, separate cores, means for connecting the cores with each other and with the intermediate block, the cores each including portions engaging and retaining the adjacent matrix block in contact with the intermediate block, and a cover plate including a molten metal delivery opening adapted to discharge into a matrix block directly below the cover plate.

In testimony whereof I affix my signature.

JULIUS CEASAR VIVES.